March 22, 1960  P. J. KIRCHER  2,930,032
COFFEE MAKER
Filed March 25, 1958

INVENTOR
PAUL J. KIRCHER

BY *Lindsey and Prutzman*
ATTORNEYS

United States Patent Office 2,930,032
Patented Mar. 22, 1960

2,930,032
COFFEE MAKER

Paul J. Kircher, Plainville, Conn., assignor to Landers, Frary & Clark, New Britain, Conn., a corporation of Connecticut Application March 25, 1958, Serial No. 723,887

4 Claims. (Cl. 340—252)

This invention relates generally to improvements in electric coffee makers and more particularly to an improved visual indicating device associated therewith.

A major object is to provide an improved visual indicating device for electric coffee makers which may be used, for example, to indicate that the coffee has been percolated and is being maintained heated for use.

A further object is to provide an electric coffee percolator with an improved and attractive base which in addition to serving the usual purpose, also serves as an unusual and effective visual indicator easily viewable from all angles.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
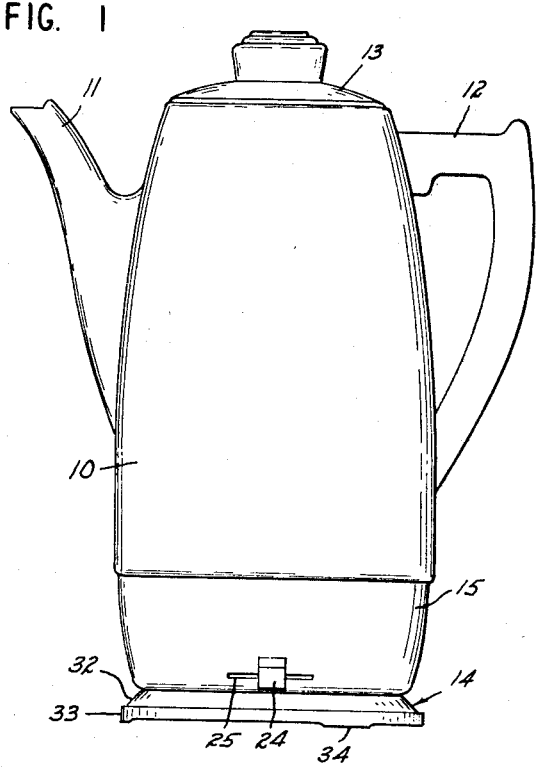
Fig. 1 is a side view of an electric coffee percolator with the invention incorporated therein.
Figure 2:
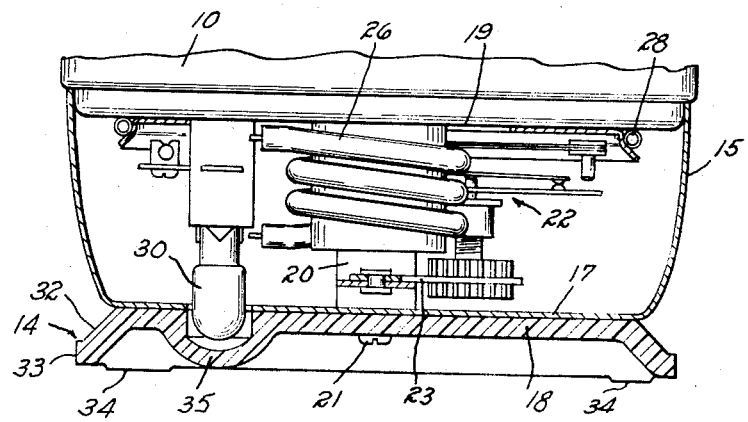
Fig. 2 is a fragmentary view of the bottom portion thereof partially shown in vertical section.

Fig. 1 illustrates a conventional type of electric coffee percolator comprising vessel 10, spout 11, handle 12, cover 13, false bottom 15, and a plastic base 14 of novel construction as described below, providing support for false bottom 15 and vessel 10. The false bottom 15 houses the heating and control mechanism which is positioned between the base and the vessel. As shown in Fig. 2, false bottom 15 has a closed lower end 17 resting on the top face 18 of plastic base 14, the base 14 being clamped thereto by a screw 21 threadably received by a bracket 20, which is fixed to depend from the bottom wall 19 of vessel 10. The heating and control mechanism which in this instance is supported by vessel 10 either directly or by bracket 20, is merely shown for illustrative purposes, neither the structure nor the circuit arrangement other than the pilot bulb having any direct bearing on the present invention.

However, the thermostatic unit 22, adjustable by lever 23 from knob 24, Fig. 1, extending exteriorly of false bottom 15 for manual adjustment along slit 25, determines the length of the percolation cycle during which main heater element 26 is operative, that element being turned off at the end of the percolation cycle by thermostat 22 and an auxiliary heating element 28 being turned on to maintain the brewed coffee at a temperature for use. The known circuitry involved is such that pilot light bulb 30 is turned on simultaneously with the deactivation of main heater element 26 and activation of auxiliary heating element 28, and remains on as long as the percolator is plugged into an outlet receptacle.

While it is common practice to employ a pilot bulb such as bulb 30, but positioned to be viewed from the exterior of the percolator, the bulb as shown is positioned for co-operation with base 14 in a novel manner as follows. Base 14, of annular configuration to match the configuration of the percolator, includes a frusto-conical outer wall 32 leading into a cylindrical side wall portion 33 provided with depending feet 34 spaced circumferentially thereof. The horizontal base wall 18 is provided at a position offset from the center thereof with a bubble-like depression 35 into which pilot bulb 30 projects to the extent that a portion of bulb 30 is in horizontal alignment with the wall 18.

Base 14 is constructed of a solid piece of acrylic resin which is commercially available, for example, under the trademarks Plexiglas and Lucite. Such material is known to be a light conductor and is characterized by the fact that light introduced into such material is evenly dispersed therethrough with the light rays confined to the material somewhat in the manner that electricity is confined to a conductor as long as the light rays do not meet a surface of the material beyond a critical angle of 42.2° from the direction of propagation of the light rays. When a lesser angle is met, the light rays are reflected back from the surface skin and do not escape. When a greater angle is met, the light rays escape from the acrylic resin with the result that the surface defining the angle involved is illuminated.

The above principle is employed in the structure of Fig. 2 to edge light the outer margins of base 14. Light rays from bulb 30 diffuse in all directions through the material of base wall 18 irrespective of the position of bulb 35 in respect to wall 18. As the rays are transmitted radially in all directions from the lower end of bulb 30 and reach all portions of the frusto-conical base margin 32, the surface angularity of which is greater than the critical angle mentioned, a 45° angle being shown, that entire portion of the base is uniformly illuminated. The resulting illuminated annulus is viewable from all angles, with the illumination soft and pleasing, being devoid of glare. Since light rays are thus transmitted with equal effectiveness, regardless of color, the base may be illuminated in any desired color by providing bulb 30 in that color.

I claim:

1. In an electric percolator in which a pilot bulb remains lighted during continuous heating of brewed coffee, an acrylic resin base provided with a chamber in which the pilot bulb is disposed in a manner to transmit light rays radially through the base material, the base having outer marginal surfaces disposed at an angle, in respect to the major plane of the base, greater than the critical angle of light ray transmission therethrough, whereby said surfaces are illuminated by light rays from the bulb.

2. In an electric percolator of the type in which coffee is first brewed and then retained heated for use and having a visual indicator which is activated upon termination of the brewing cycle to remain activated during continued heating, an acrylic resin base comprising a vessel supporting wall having an integral marginally depending portion for the spaced support of said wall above a supporting surface, said wall being provided with an opening, a pilot bulb disposed in said opening in a position for the transmission of radially directed light rays through the material of said wall, said marginally depending portion having an outer surface disposed at an angle greater than the critical angle for light ray transmission through acrylic resin, whereby said marginally depending portion is illuminated by rays of said bulb.

3. The device of claim 2 wherein said wall is provided with an upwardly open depending integral bubble-like portion in which the bulb is positioned with portions thereof in the major plane of said wall.

4. The device of claim 2 wherein said marginally depending base portion is of frusto-conical configuration.

References Cited in the file of this patent

UNITED STATES PATENTS

| | | |
|---|---|---|
| 2,773,166 | Best | Dec. 4, 1956 |
| 2,839,670 | Gladstone | June 17, 1958 |